United States Patent [19]

Martin

[11] 4,013,060

[45] Mar. 22, 1977

[54] ROTARY GRATE

[76] Inventor: Johannes Josef Martin, Leopoldstrasse 248, 8 Munich 40, Germany

[22] Filed: Aug. 6, 1975

[21] Appl. No.: 602,399

[30] Foreign Application Priority Data

Aug. 9, 1974 Germany .......................... 2438448

[52] U.S. Cl. ........................... 126/163 R; 126/181; 110/35; 110/74
[51] Int. Cl.² ........................................... F23H 1/02
[58] Field of Search .............. 110/35, 74; 126/181, 126/163

[56] References Cited

UNITED STATES PATENTS 1,497,823  6/1924  Worker ........................... 110/32 R

FOREIGN PATENTS OR APPLICATIONS 9,555  4/1912  United Kingdom ................. 110/74

Primary Examiner—John J. Camby
Assistant Examiner—Larry I. Schwartz
Attorney, Agent, or Firm—Michael J. Striker

[57]  ABSTRACT

An assembly of coaxial rotor units which form part of a grate in an industrial furnace and serve to transport as well as to admit air to solid fuel in uncombusted and/or at least partially combusted state. Each rotor unit has a shell which is assembled of heat-resistant fuel-contacting rings and has gaps for discharge of air into fuel, a hollow core which is received in and rotates with the shell and whose cylindrical wall has apertures for admission of air into compartments disposed between the shell and the core and communicating with the gaps between the rings. The end walls of the core rotate with or relative to trunnions at least one of which admits air into the core so that such air flows through the apertures of the cylindrical wall, into the compartments and issues via gaps to contact the fuel. The core can receive a cylindrical drum which has a peripheral helix or discrete distancing projections and serves to regulate the flow of air along the inner surface of the cylindrical wall so that the cooling of core is more pronounced in regions which are nearer to fuel. The rings of the shell are assembled of heat-resistant segments which are fastened to the cylindrical wall of the core.

21 Claims, 3 Drawing Figures

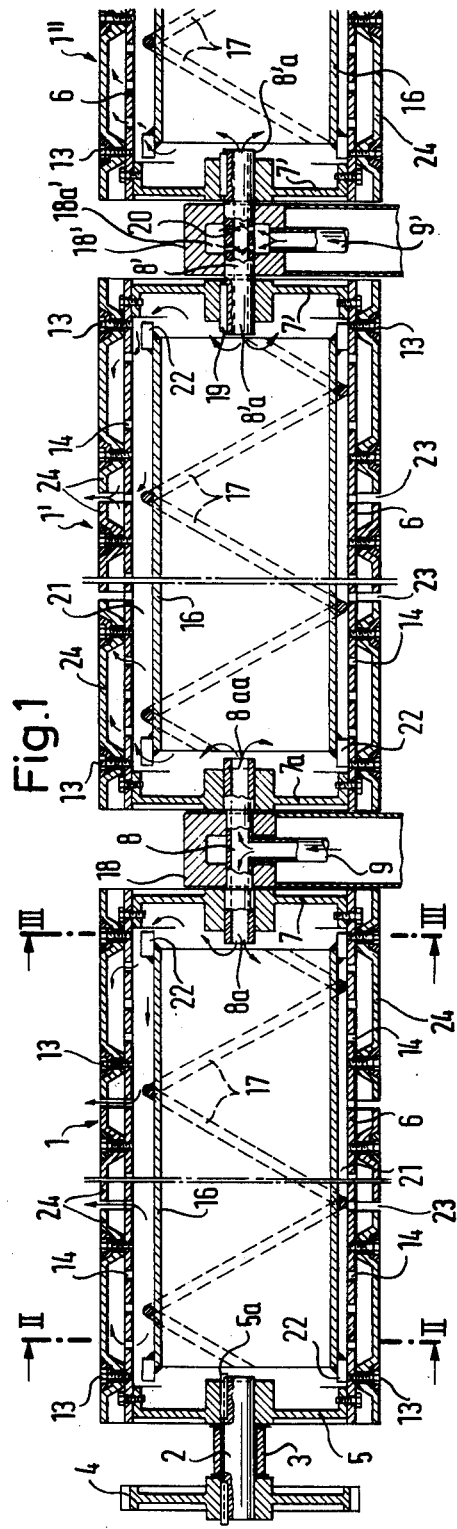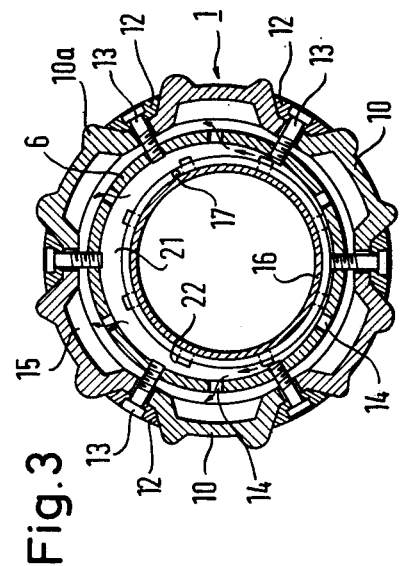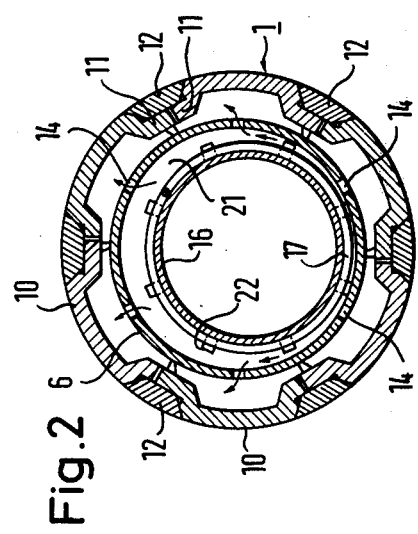

ROTARY GRATE

BACKGROUND OF THE INVENTION

The present invention relates to grates in general, and more particularly to improvements in rotary grates for transport of fuel, clinker, slag or the like. Still more particularly, the invention relates to improvements in grates which are designed to supply conbustion air in a furnace (e.g., in a large industrial furnace) to promote the oxidation of fuel, clinker or the like.

German Pat. No. 612,972 discloses a rotary grate which is formed with openings for admission of combustion air into a layer of clinker which rests on and is conveyed by the grate. The rotary grate is installed at the discharge end of an industrial furnace to transfer clinker into an evacuating duct. The rotary grate is disposed above a chamber which receives air by way of a pipe and the upper end of which is substantially sealed by the grate. The grate has slots or holes for reception of air from the chamber while the slots or holes travel above the upper end of the chamber, and such air passes through the interior of the rotary grate and contacts the layer of clinker by passing through those slots or holes which are out of register with the upper end of the chamber. The layer of clinker is thereby completely combusted prior to entering the aforementioned evacuating duct. Air which enters the rotary grate by way of the slots or holes also serves to cool the grate. However, the cooling action of air which is supplied by the chamber is not uniform and not predictable with a requisite degree of reproductibility. As a rule, the cooling action varies at random, as considered in the axial direction of the rotary grate. For example, if the layer of clinker heats the rotary grate to a temperature at which the adjacent particles or batches of clinker begin to flow, the thus obtained liquefied clinker adheres to the periphery of the grate and is likely to clog the air-discharging slots or holes. Consequently, air streams issuing from the chamber cannot leave the grate in those regions which require a most pronounced cooling action. This leads to accumulations of additional liquefied clinker which thereupon sets or hardens and forms a crust which prevents the outflow of any air. Air issuing from the chamber then begins to flow around the grate and past the customary sealing strips so that the quantity of air entering the interior of the grate decreases still further. The temperature of the grate continues to rise so that the thickness of the crust of liquefied and subsequently hardened clinker increases to form an envelope which can interfere with or even prevent rotation of the grate.

SUMMARY OF THE INVENTION

An object of the invention is to provide a novel and improved rotary grate which can transport, and admit air to, solid fuel in uncombusted and/or at least partially combusted state, especially to coal and/or clinker.

Another object of the invention is to provide a rotary grate or rotor assembly which can be used with advantage in large industrial furnaces and is constructed and assembled in such a way that each portion thereof which is nearer to fuel is cooled more intensively than the portion or portions which are exposed to lower temperatures.

A further object of the invention is to provide a rotor assembly which can transport fuel in uncombusted and/or at least partially combusted state and wherein all such parts or components which contact the fuel can be properly cooled even if the fuel is liquefied as a result of heating during combustion and tends to adhere to the rotor assembly.

An additional object of the invention is to provide a rotor assembly for use as a rotary grate for solid fuels with novel and improved means for invariably cooling the fuel-contacting parts to such an extent that the fuel is incapable of adhering, or at least highly unlikely to adhere, to such fuel-contacting parts.

The invention is embodied in a grate for solid fuels in uncombusted and/or at least partially combusted state, e.g., for coal or clinker in a large industrial furnace. The grate comprises a rotor assembly which includes at least one rotor unit, means for rotating the rotor unit, and means for admitting air into the interior of the rotor unit. The rotor unit comprises a fuel-contacting hollow drum-shaped shell having openings (e.g., in the form of gaps disposed between neighboring rings which consist of a heat-resistant material and together form a relatively long shell) for introduction of air into fuel from within the shell, and a hollow core mounted in the shell and having an apertured cylindrical wall defining with the shell at least one compartment. When the rotating means drives the core and the shell, the unit advances the fuel which contacts the shell (e.g., into a duct or clinker). The air admitting means admits air into the core so that such air passes outwardly through the apertures of the cylindrical wall, into the compartment or compartments between the cylindrical wall of the core and the shell, and outwardly through the openings of the shell.

The novel features which are considered as characteristic of the invention are set forth in particular in the appended claims. The improved grate itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary central longitudinal sectional view of a rotary grate which embodies the invention;

FIG. 2 is a transverse sectional view as seen in the direction of arrows from the line II—II of FIG. 1; and FIG. 3 is a transverse sectional view as seen in the direction of arrows from the line III—III of FIG. 1.

DESCRIPTION OF THE PREFERRED EMBODIMENTS

FIG. 1 shows a portion of a multiple-track rotor assembly for transport of and admission of air to solid fuel or clinker. The assembly comprises a discrete horizontal rotor unit for each track. Each of the rotor units is relatively long, i.e., the axial length of each rotor unit may greatly exceed two diameters. The two left-hand rotor units 1 and 1' of FIG. 1 are actually longer than shown, and the same applies for the remaining rotor unit or units.

The left-hand rotor unit 1 is one of the two outermost rotor units of a series of at least three coaxial units. This left-hand rotor unit 1 comprises a trunnion 2 which is rotatable in a stationary bearing sleeve 3 and one end portion of which is keyed to the output element 4 of a drive. The output element 4 may constitute a worm wheel, a gear, a friction wheel, a ratchet wheel or any other suitable device which can rotate the left-hand rotor unit 1 at a selected speed. The other end portion of the trunnion 2 is keyed (as at 5a ) to a disk-shaped end wall 5 which is rigid with one end portion of a hollow cylindrical wall 6 of the left-hand rotor unit 1. The other end portion of the wall 6 is connected with a similar disk-shaped end wall 7 whose hub is rotatable on one end portion 8a of a stationary trunnion 8 fixedly mounted in a stationary bearing member or bracket 18. The median portion of the trunnion 8 communicates with the discharge end of a pipe 9 which supplies air to the one end portion 8a and also to the other end portion 8aa of the trunnion 8. The end portion 8aa is surrounded by the hub of a third disk-shaped end wall 7a forming part of the median rotor unit 1' of FIG. 1 and being bolted, screwed or otherwise affixed to the left-hand end portion of a hollow cylindrical wall 6 in the median rotor unit 1'. The median and right-hand rotor units 1' and 1" of FIG. 1 are rotated by a second drive (not shown) which is similar to or identical with the drive including the output element 4. Thus, and if the right-hand rotor unit 1" of FIG. 1 is the other outermost rotor unit of the assembly, the right-hand end portion of its wall 6 is connected with an end wall corresponding to the end wall 5, and such end wall is secured to a trunnion corresponding to the trunnion 2 and being driven by a gear, ratchet wheel, friction wheel or worm wheel. The rightmost wall 6 of FIG. 1 then rotates the wall 6 of the median rotor unit 1'.

The right-hand end portion of the wall 6 in the median rotor unit 1' is rigid with a disk-shaped end wall 7' which receives torque from the left-hand end portion 8'a of a hollow trunnion 8'. The right-hand end portion 8'a of the hollow trunnion 8' receives torque from the disk-shaped end wall 7' at the left-hand end of the wall 6 in the rightmost rotor unit 1" of FIG. 1. The means for securing the end walls 7' to the respective end portions 8'a of the hollow trunnion 8' comprises keys 19. The trunnion 8' is rotatable in a stationary bearing member or bracket 18' which has an internal chamber 18a' communicating with the discharge end of an air supplying pipe 9'. The median portion of the trunnion 8' has openings (e.g., radial holes or bores) 20 which communicate with the chamber 18a' so that the end portions 8'a can admit air into the walls 6 of the respective (median and right-hand) rotor units 1' and 1". It will be noted that the end portions 8a, 8aa of the trunnion 8 serve to support the respective end walls 7, 7a as well as to admit streams of air into the walls 6 of the left-hand and median rotor units 1 and 1'. The trunnion 8' supports the respective end walls 7', receives torque from the right-hand end wall 7', transmits torque to the left-hand end wall 7' and admits air into the right-hand end portion of the median cylindrical wall 6 as well as into the left-hand end portion of the right-hand cylindrical wall 6. If the structure of FIG. 1 comprises four or more rotor units, the number of bearing members 18' and trunnions 8' exceeds one and equals $n-2$ wherein $n$ is the total number of rotor units.

Each rotor unit further comprises a cylindrical envelope or shell which is coaxial with and surrounds the respective cylindrical wall 6. Each such shell consists of two or more coaxial rings 24 which are separated from each other by openings or gaps 23 for escape of combustion air supplied via apertures 14 of the respective cylindrical wall 6. Each ring 24 of the shell is assembled of several (e.g., six) arcuate sections or segments 10 which are shown in FIGS. 2 and 3. The material of the segments 10 should be capable of standing elevated temperatures because the shells come in direct contact with hot fuel or clinker. The segments 10 have radially inwardly extending marginal portions 11 which are parallel to the axis of the respective cylindrical wall 6. Each marginal portion 11 of a segment 10 defines with one marginal portion 11 of the neighboring segment 10 a recess or socket for an insert 12 which is affixed to the respective wall 6 by means of screws or analogous fasteners 13. The inserts 12 allow for at least some movement of neighboring segments 10 with respect to each other, i.e., for such movement which might take place in response to unequal heating or cooling of neighboring segments as well as owing to thermally induced expansion of the segments.

The apertures 14 are uniformly distributed in the cylindrical walls 6 so as to insure a uniform or nearly uniform admission of combustion air into all portions of compartment or compartments 15 between the shell and the wall 6 of a rotor unit. The apertures 14 of the leftmost wall 6 of FIG. 1 receive air from the axial passage in the end portion 8a of the trunnion 8; the apertures 14 of the median wall 6 receive air from the axial passage in the right-hand end portion 8aa of the trunnion 8 as well as from the axial passage in the left-hand end portion 8'a of the trunnion 8'; and the rightmost wall 6 of FIG. 1 receives air only from the axial passage in the right-hand end portion 8'a of the trunnion 8' or at both ends, depending upon whether this rightmost cylindrical wall forms part of an intermediate rotor unit or the right-hand outermost rotor unit. The compartments 15 discharge streams of air into fuel or clinker on top of the respective rotor units 1, 1' and 1" by way of the openings or gaps 23 between the discrete rings 24 of the respective shells.

Each cylindrical wall 6 constitutes with the associated end walls (such as the end walls 5, 7 of the rotor unit 1) a hollow core which is coaxial with and shares all rotary movements of the respective shell.

Each cylindrical wall 6 surrounds an air displacing and distributing drum 16 which is not driven, i.e., each drum 16 is simply inserted into but need not rotate with the respective hollow core. The length of each drum 16 is preferably only slightly less than the length of the respective wall 6. The periphery of each drum 16 is provided with or connected to a helical distancing and air flow inducing member 17 (e.g., a piece of suitably coiled round steel stock which is welded or otherwise affixed to the external surface of the respective drum 16). The purpose of the helical members 17 is to induce air to flow along a helical path which is adjacent to the inner surface of the respective wall 6 whereby such air escapes into the respective compartments 15 via apertures 14. As shown, the left-hand drum 16 is open at its right-hand end (but preferably at both ends) so that it can receive air from the passage in the end portion 8a of the trunnion 8. The drum 16 of the median rotor unit 1' should be open at both ends so that it can receive air from the right-hand end portion 8aa as well as from the left-hand end portion 8'a of the trunnion 8'. Air which enters a drum 16 issues at each of its ends and enters the annular clearance 21 between such drum and the respective wall 6. Such air is thereupon caused to flow along a helical path, to pass through the apertures 14 and into the compartments 15 whence it issues by way of openings 23 between the rings 24 of the respective shell. The members 17 enchance the exchange of heat between air and the corresponding cylindrical walls 6.

Each drum 16 can rest on the respective helical member 17, i.e., such helical member can abut directly against the inner surface of the respective wall 6 (at the 6 o'clock position, as viewed in FIG. 2 or 3). Alternatively, or in addition to distancing members 17, the end portions of each drum 16 can carry several relatively small discrete distancing elements 22 whose thickness (as considered radially of the respective drum 16) exceeds the diameter of the member 17 so that the lowermost distancing elements 22 engage and rest upon the inner surface of the respective wall 6 (again at the 6 o'clock position, as viewed in FIG. 2 or 3). The distancing elements 22 preferably constitute relatively short strips or lugs which are parallel to the axes of the respective drums 16.

The inner diameter of each cylindrical wall 6, the outer diameter of each drum 16, and the diameter of each helical member 17 (or the thickness of each distancing element 22) is preferably selected in such a way that the clearance 21 is wider above the top and narrower below the bottom of each drum 16 (see FIGS. 2 and 3). This insures that the inflowing air cools more intensively those (uppermost) portions of the walls 6 which are nearest to fuel or clinker on top of the respective shells. As a rule, the thickness of a distancing member 17, and/or a distancing element 22 (as considered in the radial direction of a rotor unit) will be less than half the difference between the inner diameter of a wall 6 and the outer diameter of the respective drum 16.

For example, the assembly of units 1, 1' and 1'' shown in FIG. 1 may constitute the rotary member 2 shown in the drawing of my U.S. Pat. No. 3,580,195.

An important advantage of the improved rotor units is that the apertures 14 in the cylindrical walls 6 cannot be clogged with fuel irrespective of the nature and condition of fuel and regardless of whether or not fuel adheres to and eventually clogs the openings 23 of the respective shell. Thus, fuel cannot penetrate into the compartments 15 so that the latter invariably receive cool air from the interior of the respective cores. Consequently, the inner side of each shell is invariably cooled by streams of air and the intensity as well as the direction of flow of such air streams can be regulated within a desired range and in such a way that the cooling action is more pronounced in regions which are nearer to fuel, i.e., where the temperature is higher. It has been found that the shells of the improved rotor units are properly cooled even if the openings 23 between their rings are completely or nearly completely clogged with fuel. Therefore, fuel is unlikely to incrustate at the outer sides of the shells because the cooling action upon the shells is not dependent upon the ability or inability of openings 23 to discharge air but rather on controllable flow of air into and in the compartments 15.

The feature that the cores of the rotor units receive air through passages which are machined into the respective trunnions renders it possible to mount the units for rotation about a common axis so that each unit can transport and admit air to a discrete layer of fuel. The feature that each trunnion which is disposed between two rotor units admits air into each of the two neighboring cores simplifies the admission of air and insures more uniform feeding of air into the core of each intermediate unit. It is also within the purview of the invention to replace the bearing sleeve 3 for the hollow rotary trunnion 2 with a bearing member 18' and to provide the trunnion 2 with openings or holes 20 so that the core of the outermost rotor unit 1 also receives air at both ends of the respective cylindrical wall 6.

An important advantage of the drums 16 (with or without helical distancing members 17) is that the drums force incoming air to flow into and outwardly through the respective apertures 14. These drums prevent the accumulation of stagnant hot air in the interior of the cores and/or in the compartments 15. Since the distancing means 17 and/or 22 of the drums 16 rest on the inner surfaces of the respective cylindrical walls 6 in regions below the common axis of the rotor units, a larger quantity of air is circulated between the drums and the uppermost portions of the inner surfaces of the walls 6, i.e., adjacent to those portions of the walls 6 which are nearest to the source of the heat. If the drums 16 are provided with helical distancing members 17, the latter induce a spiral flow of air which further promotes the exchange of heat between air on the one hand and the respective cylindrical walls 6 and shells on the other hand. The walls 6 are in direct heat-exchanging contact with substantial portions of the respective shells; therefore, the shells are cooled by air which flows into the compartments 15 as well as by the associated cores.

The shells constitute highly satisfactory heat-resistant shields for the respective cores. Owing to the aforementioned mounting of segments 10 and inserts 12, the rings of the shells can expand (in the circumferential direction of the respective rotor units) with respect to the cooler cylindrical walls 6 which latter are out of contact with fuel and are cooled in a predictable manner irrespective of the rate at and directions in which air can issue from the compartments 15.

As shown in FIG. 3, the segments 10 of the rings which form the outer shells can be provided with tooth-shaped or otherwise configurated protuberances 10a which promote the transport of fuel in the desired direction. Those portions of the rings 24 which carry protuberances 10a alternate with smooth convex ring portions (see FIG. 2). The protuberances 10a are preferably located in the regions of the fasteners 13. If desired, the protuberances 10a can extend along the full length of the respective segments 10.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a grate for solid fuels in uncombusted and/or at least partially combusted state, a combination comprising a rotor assembly including at least one rotor unit including a fuel-contacting hollow drum-shaped shell having openings for introduction of air into fuel from within said shell and a hollow core mounted in said shell and having an apertured cylindrical wall defining with said shell at least one compartment; means for rotating said shell and said core to thereby advance the fuel which contacts said shell; means for admitting air into said core, at least at one axial end of said wall, so that the thus admitted air enters said compartment by way of the apertures in said wall and leaves said shell by way of said openings; and an open-ended hollow drum received with clearance in the interior of said core, said core being rotatable with respect to said drum and the outer diameter of said drum being less than the inner diameter of said cylindrical wall.

2. In a grate for solid fuels in uncombusted and/or at least partially combusted state, a combination comprising a rotor assembly including at least one rotor unit including a fuel-contacting hollow drum-shaped shell having openings for introduction of air into fuel from within said shell and a hollow core mounted in said shell and having an apertured cylindrical wall defining with said shell at least one compartment; means for rotating said shell and said core to thereby advance the fuel which contacts said shell; and means for admitting air into said core, at least at one axial end of said wall, so that the thus admitted air enters said compartment by way of the apertures in said wall and leaves said shell by way of said openings, said shell comprising a plurality of eccentric rings disposed substantially end to end about said cylindrical wall and defining gaps which constitute said openings, said rings each comprising a plurality of arcuate segments of heat-resistant material.

3. In a grate for solid fuels in uncombusted and/or at least partially combusted state, a combination comprising a rotor assembly including at least one rotor unit in turn including: a hollow core having an axis and a cylindrical wall formed with radially throughgoing apertures, said core being roatatable about said axis; a plurality of axially spaced rings mounted on and surrounding said core and forming a fuel-contacting shell lying radially outwardly of and closely juxtaposed with said core, each of said rings defining a respective annular compartment surrounding said core and communicating with the interior thereof through said apertures, said rings being axially spaced and thereby forming openings for introduction of air into fuel from within said compartments; means for rotating said shell and said core to thereby advance the fuel which contacts said shell; and means for admitting air into said core at least at one axial end of said wall so that the thus-admitted air enters said compartments through said apertures and leaves said compartments by way of said openings.

4. The combination defined in claim 3 wherein said rings have inwardly extending flange portions, said combination further comprising means for releasably securing said rings by said portions to said core.

5. A combination as defined in claim 3, wherein said core has first and second end walls connected with said cylindrical wall and coaxial first and second trunnions connected with the respective end walls, said first trunnion having a longitudinally extending passage communicating with the interior of said core and said air admitting means being connected with said first trunnion.

6. A combination as defined in claim 5, wherein said rotating means comprises an output element connected with one of said trunnions.

7. A combination as defined in claim 5, wherein said first end wall is rotatable with respect to said first trunnion.

8. A combination as defined in claim 7, wherein said rotor assembly includes a second rotor unit coaxial with and adjacent to said one rotor unit, said second unit comprising a second shell and a second core mounted in said second shell and having an apertured cylindrical wall defining with said second shell at least one second compartment, said second core further having first and second end walls connected with said second cylindrical wall, said first end wall of said second core being rotatable on said first trunnion and the said passage communicating with the interior of said second core, and further comprising means for rotating said second rotor unit about the axis of said trunnions.

9. A combination as defined in claim 8, further comprising a stationary bearing member for said first trunnion, said bearing member being disposed between said first and second rotor units.

10. A combination as defined in claim 8, wherein said assembly further comprises a driven third rotor unit coaxial with said one unit and said second unit, said second unit being disposed between said one unit and said third unit and said means for rotating said second unit comprising a hollow third trunnion rigid with the second end wall of the core of said second unit and with one end wall of the core of said third unit.

11. A combination as defined in claim 10, wherein said third trunnion has at least one opening intermediate said second and third units and further comprising a second stationary bearing member rotatably supporting said third trunnion, said second bearing member having a chamber commuicating with the opening of said third trunnion and further comprising means for admitting air into said chamber whereby such air flows through said third trunnion and into the cores of said second and third units.

12. A combination as defined in claim 1, wherein said unit is substantially horizontal so that said drum rests on the inner surface of said cylindrical wall in the region below the axis of said unit.

13. A combination as defined in claim 12, further comprising distancing means secured to the periphery of said drum and engaging the inner surface of said cylindrical wall in said region, the thickness of said distancing means, as considered in the radial direction of said unit, being less than half the difference between the inner diameter of said cylindrical wall and the outer diameter of said drum.

14. A combination as defined in claim 13, wherein said distancing means comprises a helix.

15. A combination as defined in claim 13, wherein said distancing means comprises a plurality of discrete distancing elements.

16. A combination as defined in claim 12, wherein the axial length of said drum approximates the axial length of said cylindrical wall.

17. A combination as defined in claim 3, wherein each of said rings comprises a plurality of arcuate segments consisting of heat-resistant material each of said compartments extending axially over at least two of said apertures.

18. A combination as defined in claim 2, further comprising means for fastening said segments to said core.

19. A combination as defined in claim 18, wherein the segments of each of said rings extend in parallelism with the axis of said rotor unit and have inwardly extending marginal portions, the marginal portions of each of said segments being adjacent to marginal portions of neighboring segments of the respective rings and abutting against said cylindrical wall.

20. A combination as defined in claim 19, wherein said marginal portions define recesses in the peripheries of the respective rings and said fastening means comprises inserts received in said recesses and means for securing said inserts to said cylindrical wall.

21. A combination as defined in claim 19, wherein said marginal portions of neighboring segments of each of said rings are normally out of contact with each other to allow for thermal expansion of said segments in the circumferential direction of said shell.

* * * * *